Figure 1:
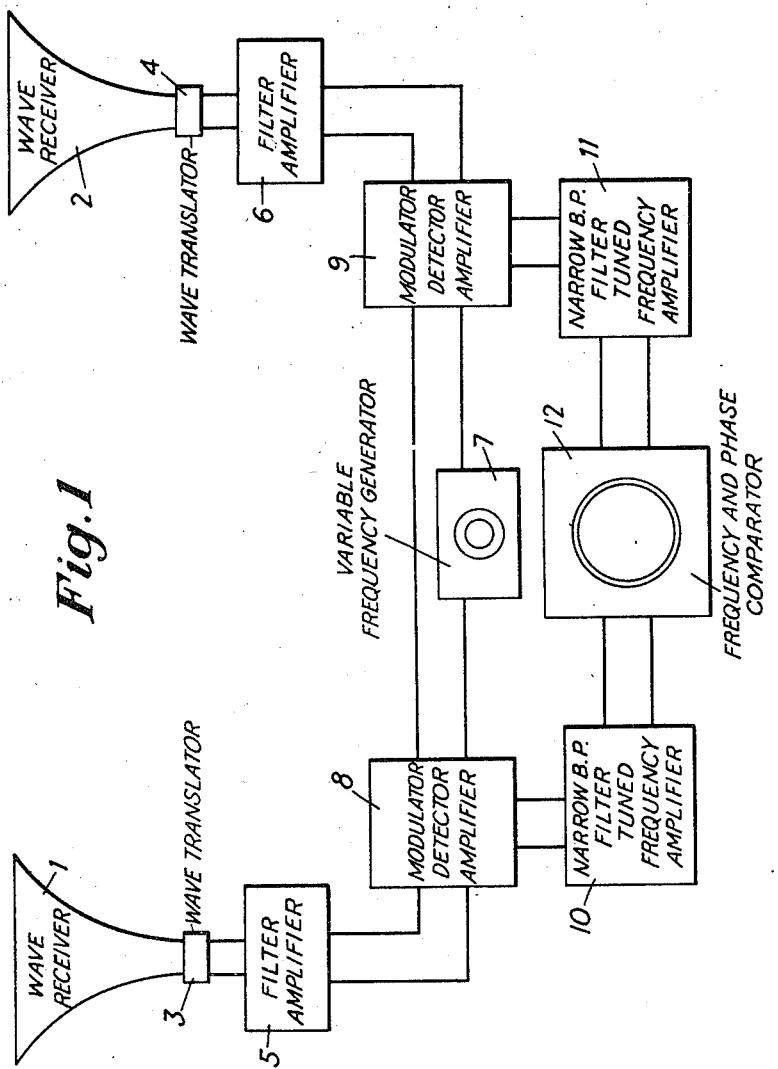

Patented May 13, 1947

2,420,439

UNITED STATES PATENT OFFICE 2,420,439

AIRCRAFT RANGE AND DIRECTION FINDER

Montford Morrison, Upper Montclair, N. J.

Application November 2, 1943, Serial No. 508,688

3 Claims. (Cl. 177—352)

This invention relates to range finding and to direction finding, and relates in particular to electronic means employed in such findings and specifically relates to electronic means employed in such findings utilizing the propeller blade sound-frequencies of aircraft to locate said aircraft.

Among the objects of the invention are; to provide an adjunct-means for certain types of range finders and for certain types of direction finders which permit the base line of the method used, to be extended comparatively to considerable distances and at the same time provide the observer with an accurate and dependable guide to direct the two receivers at the ends of the base line at one and the same object with certainty, to provide for a method of triangulation a means which when used requires only sides of the triangle to be measured, and to provide for direction finding and for range finding an artificial binaural system useful to determine the factors involved in the employment of such finders.

In the prior art, range finders and direction finders which seek to find under their operation the location of a single source of continuous wave propagation and in which art, triangulation methods are used utilizing a known base line and two receiving stations, one at each end of this line, have suffered the disadvantage of the difficulty in determining with certainty that the two separated receiving stations were operating upon wave reception from one and the same source.

The term "triangulation" as used herein is defined as any method of range finding and/or direction finding, which employs known parts of a triangle to find unknown parts thereof, and is not limited to right angle triangulation methods, but includes all methods coming under the definition herein given, and specifically binaural methods in which isosceles triangles are used.

With the foregoing hypothesis understood, the description hereafter will be limited to range finders and direction finders utilizing sound waves from a single source of propagation. With this procedure, the elimination of generalities, expansive developments and other and obtrusive factors, the teaching of the spirit of the invention can be more understandingly presented.

The kinds of objects of which the present invention seeks to find direction, and range, from a base line, all have a predominantly fundamental frequency wave of sound propagation, examples of which are aircraft engines, submarine engines and machines having similar exhaust sound characteristics.

In an approaching group of aircraft in flight formation, with all the aircraft engines operating at approximately the same speed, it is difficult by common binaural methods to find a direction of a particular aircraft because of the inability of the human ear to provide the frequency selectivity required to distinguish between the speed of one aircraft-engine and another.

The present invention provides a means by which one aircraft-engine may be differentiated from another, where the propeller blade sound frequency of one aircraft engine differs from another by any perceptible amount, say of the order of a few cycles per minute.

In addition to providing a means of differentiating aircraft-engine propeller blade sound frequencies, differing by very small amounts, this invention further provides means to select the propeller blade frequency sound waves from a single aircraft-engine, and to measure the phase differences between the signals received at the two stations located at the ends of the base line, regardless of the length of the base line, and with an accuracy greatly in excess of that obtained by the use of the human ear for this purpose.

These means, when incorporated in the proper triangulation systems, having the proper mechanical devices for making the physical measurements required, provide, among others, the following improvements:

A sound direction finder having an artificial binaural system possessing a high degree of accuracy;

A continuous sound wave range finder employing angular measurements made on a comparatively very long base line;

A continuous sound wave range finder measuring the difference between the length of the hypotenuse of and the range-side of a right-angled triangle, and by utilizing the base line thereof, eliminating the necessity of making angular measurements physically, two such difference measurements being required to determine the range.

The expression "artifical binaural system," as used herein, is defined as a device-means of comparing the phase-angle between two fragmentary sound waves, received at different locations from a sound source, which said means does not depend upon human ears, for the said comparing.

Figure 2:
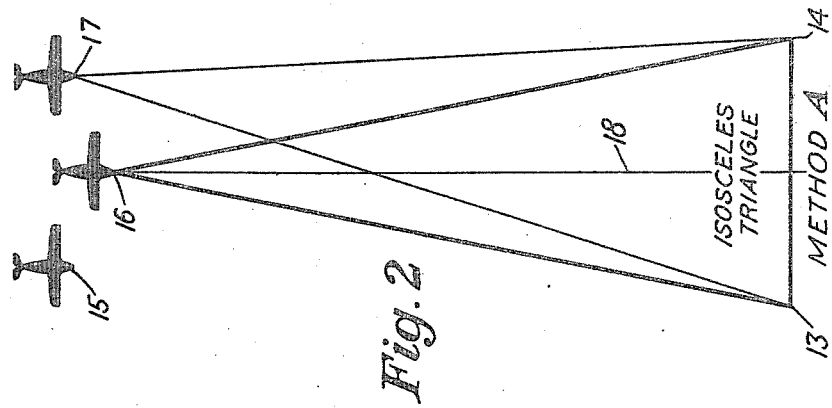
Figure 3:
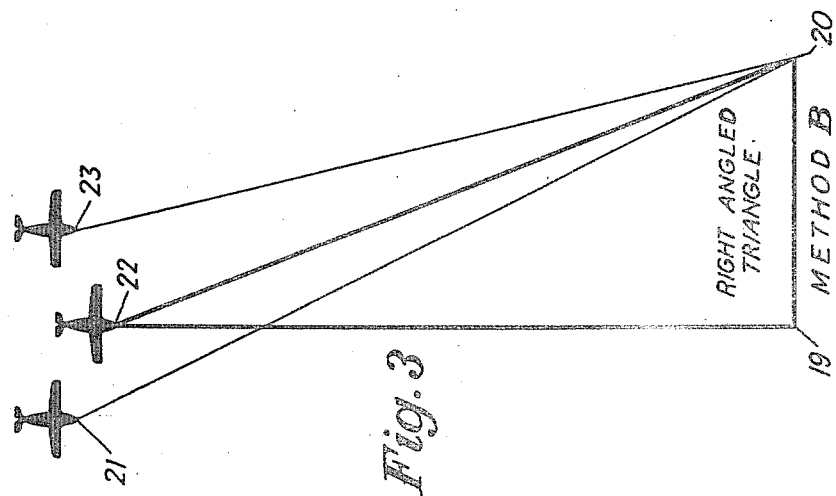

Other and further objects, improvements and facilities, provided for direction finders and range finders, will be pointed out and obvious in the reading of the description hereunder, particularly when taken in connection with the drawings in which Fig. 1 is a block diagram illustrating the electronic elements of one embodiment of the invention employed in sound wave direction finders and/or in sound wave range finders, and Figs. 2 and 3 are diagrams useful in understanding the operation of Fig. 1.

The mechanical supporting structure, including any and all means which may be used to connect and/or operate the elements shown in Fig. 1, have been eliminated for clearness.

The elements shown in Fig. 1 may be all mounted in fixed relation one to the other, in a gimbal bearing arrangement, such as found in common binaural direction finders, or the various elements may be located and mounted so as to be independently directable or directable in synchronism as the embodiment at hand may demand, and since all such mechanical devices are common knowledge in the art, no description of them is herein given, it being understood that those skilled in the art to which this invention appertains, will be able to embody the present invention in whatever mechanical device or devices may be indicated.

Referring to Fig. 1, 1 and 2 are conventional sound direction finder receiving horns, spaced apart at any desirable distance, and which may be coupled together rigidly, or they may be mounted in independent bearings, and directed from a single station by any of the various telecontrol devices commonly known in the art. These horns in association with their receiving circuits have directional properties commonly inherent in known such devices and the horn outputs are delivered to substantially identical receiving circuits as illustrated in the figure.

3 and 4 are suitable microphones which have their inputs connected to amplifiers 5 and 6, which may include filtering if and when desired. The type of filters employed in 5 and 6 will depend upon circumstances, the object being of course, to eliminate as much of the microphone inputs into the amplifier as are not necessary to the end result. 7 is a variable frequency generator coupled to circuits 8 and 9, which are in turn coupled to amplifiers 5 and 6, respectively. Circuits 8 and 9 comprise modulating means by which the output of amplifiers 5 and 6 may be combined with or modulated upon the output of the variable frequency generator 7. The purpose of this coupling combination is two-fold.

First, it provides a means of converting the fundamental output frequencies of 5 and 6 to a single frequency when and only when the fundamentals of the two fragmentary sound waves received at 1 and 2, are of exactly the same frequency; and secondly, it provides a means if and when desired to raise this resultant frequency to a value which is conducive to highly selective filtering.

After modulation in circuits 8 and 9, detection is provided to obtain this new frequency value referred to, and in general it may be said that it is amplified and preferably by a tuned frequency amplifier. The output of 8 and 9 is fed to circuits 10 and 11 which contain narrow bandpass filters and generally tuned frequency amplifiers. The outputs of 10 and 11 are fed into a frequency and phase comparator, which may be any means suited to the purpose and specifically may be a cathode ray oscillograph employing a single cathode ray tube, fed by one of the common electronic switching devices, or preferably, it may be a single glass tube envelope, containing two complete cathode ray tube sets of elements focused on a single screen employing a common source of sweep-circuit voltage.

The sweep-circuit voltage is preferably locked-in with one of the input circuits, either 10 or 11, in which case the trace of the wave form from the input circuit with which it is locked-in, will remain stationary upon the screen of the cathode ray tube. The frequency and phase relations of the two waves are then compared by methods well known in the art and do not require disclosure herein.

A few examples of the embodiment of this invention in continuous sound wave range finders and continuous sound wave direction finders will be given.

Referring to Fig. 2, which will be classified herein as Method A, the line between points 13 and 14, is the base line of the method used. Wave receiver 1, Fig. 1, is located at the point 13, Fig. 2, and the wave receiver 2, Fig. 1, is located at the point 14, Fig. 2. The geometrical axes of wave receiver 1 and 2 may be fixed, one with relation to the other, and moved jointly as is common practice in the art in binaural direction finders, or they may be pointed individually as the case may indicate. However, assuming that wave receivers 1 and 2 are fixedly mounted in gimbal bearings, as is common in the art, and that the direction finder thus formed is pointed in the general direction of the sources of continuous sound waves 15, 16 and 17, physical adjustment of these wave receivers is resorted to as is common in the art. Under these conditions, Figure 1 functions as follows:

Physical direction exploring is resorted to after the method common in the art with the continuous back and forth adjustment of variable frequency generator 7, Fig. 1.

If and when the frequency of variable generator 7 is such that the sound source 16 is tuned in, phase difference is indicated on the instrument 12, Fig. 1. The obvious indicated adjustments are repeated until the phase indicator 12 indicates zero phase difference between the two fundamental waves which have been tuned in. When this set of conditions is achieved, the direction of the object lies along the direction of the bisector of the isosceles triangle 18, Fig. 2, as is well understood by those skilled in the art of binaural direction finders. The description and operation above given thus provides an artificial binaural system employing electronic tube devices which results in an improved accuracy not obtainable with human ears.

Referring to Fig. 3, which will be classified herein as Method B, which may be divided into two different methods as will be hereinafter pointed out, it utilizes a base line between points 19 and 20, and a right angle at the point 19.

In the right-angled triangle method, one set of Fig. 1 elements embodied in apparatus and utilized, as described in connection with Fig. 2, is located at the point 19, with the bisector 18, Fig. 2, coinciding with the orthogonal erected at 19 on the base line 19—20.

By the method of operation described in connection with Fig. 2, the direction from point 19 to a single source of sound wave propagation 22 is established.

By the employment of a second set of complete apparatus, as described in connection with Fig. 1, locating wave receiver 1 at point 19 and wave receiver 2 at point 20, Fig. 3, wave receiver 2 may be swung about suitably graduated arcs until the direction 20—22 is attained in which case comparator 12, Fig. 1, of the second set of apparatus of the group will indicate identical frequencies, establishing the common origin for the sound waves received by said wave receivers 1 and 2, and the angle at point 20 may be read on the said graduated arcs, establishing the necessary information for the right angle triangulation required in the use of the present invention as a sound wave range finder.

If wave receiver 2 is pointed in the direction 20—21 or 20—23, slight differences in frequency will either prevent the wave received by wave receiver 2 from appearing on the comparator 12 at all, but if the frequencies are sufficiently close, the fundamental may be received and indicated on comparator 12, but in any case, it will drift to the right or left and will not remain stationary unless the engine speeds of the two sources are precisely the same without any variations whatever, which is a condition imposseble to maintain.

As a second division of method B, instead of physically observing the angles on the graduated arcs of wave receiver 2, as referred to above, the phase difference between the arrival of the wave at point 19 and point 20, can be actually measured on the comparator 12, measuring with considerable accuracy the difference between the length of the line 20—22 and the line 19—22. By the multiple use of these difference measurements, the range of the source of the continuous wave propagation may be ascertained by methods well known in the art of impulse sound wave range finding commonly used to locate the origin of large field-gun fire.

It will be appreciated by those skilled in the art that instead of using a variable frequency generator with dual systems of modulation and detection and filtering, mechanically coupled narrow band filters may be used directly with the elimination of circuits and devices 7, 8 and 9, but this results in a less satisfactory embodiment of the invention herein disclosed.

Various modifications and variations may be made in the circuits in the apparatus herein described and the invention is not limited to sound waves and is applicable to other waves including electro-magnetic waves, but the scope of the invention is set forth in the claims hereunder.

What I claim is:

1. The method of wave direction-finding of a location of a source of continuous one frequency wave propagation comprising receiving portions of said propagation by two wave receivers separated by a direction-finding base-line and having substantially identical directional receiving characteristics, heterodyning the outputs of said two receivers with a single selectable frequency, transmitting the separate heterodyned outputs of said receivers through substantially identical separate narrow band-pass filters to eliminate from the two outputs thereof substantially all frequencies but the one frequency resulting from heterodyning first said one frequency and said selectable frequency, applying from said two outputs last said one frequency from each thereof to a comparator, and obtaining the direction of said source by orienting said receivers in fixed base-line relation to obtain an indication in said comparator of phase position equality of the frequency of said two outputs independently of equality of amplitudes thereof.

2. The method of wave range-finding of a location of a source of continuous one frequency wave propagation comprising receiving portions of said propagation by two wave receivers having a range-finding base-line and having substantially identical directional receiving characteristics, heterodyning the outputs of said two receivers with a single selectable frequency, transmitting the separate heterodyned outputs of said receivers through substantially identical separate narrow band-pass filters to eliminate from the two outputs thereof substantially all frequencies but the one frequency resulting from heterodyning first said one frequency and said selectable frequency, applying from said two outputs last said one frequency from each thereof to a comparator, and obtaining the range of said source by orienting said receivers by adjustment of base-line relation to obtain an indication in said comparator of optimum values of last said one frequency of said two outputs and of last said one frequency only, whereby pick-up from other frequency sources is substantially eliminated.

3. In an apparatus for range-finding of a source of one frequency wave propagation comprising two wave receivers in space relation providing a base-line for range reckoning, a generator of selectable frequency providing heterodyning for each of the outputs of said receivers, a narrow fixed band-pass filter for each of said outputs passing only the heterodyned frequency thereof, and a comparator for said filter outputs providing means conjointly with said base line to reckon the range of said source.

MONTFORD MORRISON.

REFERENCES CITED

The following references are of record in the file of this patent:

UNITED STATES PATENTS

| Number | Name | Date |
|---|---|---|
| 2,166,991 | Guanella | July 25, 1939 |
| 1,149,976 | Furber | Aug. 10, 1915 |
| 2,273,640 | Haantjes et al. | Feb. 17, 1942 |
| 2,170,835 | Simon | Aug. 29, 1939 |
| 1,983,254 | Turner | Dec. 4, 1934 |
| 2,262,931 | Guanella | Nov. 18, 1941 |
| 1,564,303 | Wold | Dec. 8, 1925 |
| 1,385,795 | Ries | July 26, 1921 |
| 2,349,370 | Orner | May 23, 1944 |
| 2,206,923 | Southworth | July 9, 1940 |

FOREIGN PATENTS

| Number | Country | Date |
|---|---|---|
| 482,717 | Great Britain | Apr. 1, 1938 |
| 473,067 | Great Britain | Oct. 6, 1937 |